United States Patent
Watanabe et al.

(10) Patent No.: US 10,422,634 B2
(45) Date of Patent: Sep. 24, 2019

(54) ESTIMATING DEVICE AND ESTIMATING PROGRAM

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Akihiro Watanabe, Nagakute (JP); Yusuke Kataoka, Susono (JP); Tadashi Sakai, Kariya (JP); Naoki Kawasaki, Kariya (JP)

(73) Assignees: TOYOTA JIDOSHA KABUSHIKI KAISHA, Toyota-shi, Aichi (JP); DENSO CORPORATION, Kariya-shi, Aichi (JP)

( * ) Notice: Subject to any disclaimer, the term of this patent is extended or adjusted under 35 U.S.C. 154(b) by 61 days.

(21) Appl. No.: 15/735,357

(22) PCT Filed: Jun. 24, 2016

(86) PCT No.: PCT/JP2016/068920
§ 371 (c)(1),
(2) Date: Dec. 11, 2017

(87) PCT Pub. No.: WO2017/010268
PCT Pub. Date: Jan. 19, 2017

(65) Prior Publication Data
US 2018/0180409 A1 Jun. 28, 2018

(30) Foreign Application Priority Data
Jul. 13, 2015 (JP) ................................ 2015-139792

(51) Int. Cl.
*G01B 11/26* (2006.01)
*G06T 7/60* (2017.01)
*G06T 7/73* (2017.01)

(52) U.S. Cl.
CPC ............... *G01B 11/26* (2013.01); *G06T 7/60* (2013.01); *G06T 7/73* (2017.01);
(Continued)

(58) Field of Classification Search
None
See application file for complete search history.

(56) References Cited

U.S. PATENT DOCUMENTS 5,638,116 A * 6/1997 Shimoura ............ G05D 1/0246
348/118
8,571,265 B2 * 10/2013 Takiguchi .......... G01C 21/3602
382/104

(Continued)

FOREIGN PATENT DOCUMENTS

JP 2006-234682 A 9/2006
JP 2012-026992 A 2/2012

OTHER PUBLICATIONS

Harris et al., "A Combined Corner and Edge Detector," Proceedings of the 4th Alvey Vision Conference, pp. 147-151, 1988.
(Continued)

*Primary Examiner* — Fayyaz Alam
(74) *Attorney, Agent, or Firm* — Sughrue Mion, PLLC

(57) ABSTRACT

An estimating device includes: a movement amount computing section that, on the basis of a position of a predetermined region within an image picked-up at a first time, and a position of a region that corresponds to the predetermined region and is within an image picked-up in a same direction at a second time that is after the first time, computing a movement amount of the predetermined region in a vertical direction; a movement amount integrating section that computes an integrated value of the movement amounts, each time the movement amount is computed; a correcting section that corrects the integrated value of a current point in time on the basis of time series data of the integrated values
(Continued)

of the movement amounts within a past predetermined time period; and an estimating section that estimates a pitch angle of the vehicle on the basis of a corrected integrated value.

8 Claims, 6 Drawing Sheets

(52) U.S. Cl.
CPC ............... *G06T 2207/10016* (2013.01); *G06T 2207/30244* (2013.01); *G06T 2207/30248* (2013.01); *G06T 2207/30256* (2013.01)

(56) References Cited

U.S. PATENT DOCUMENTS

| | | | |
|---|---|---|---|
| 2012/0200707 A1* | 8/2012 | Stein | G01C 3/22 348/148 |
| 2016/0207533 A1* | 7/2016 | Uechi | G08G 1/166 |
| 2017/0008521 A1* | 1/2017 | Braunstein | G01C 21/32 |

OTHER PUBLICATIONS

International Search Report for PCT/JP2016/068920, dated Sep. 13, 2016 (PCT/ISA/210).

\* cited by examiner

US 10,422,634 B2

ESTIMATING DEVICE AND ESTIMATING PROGRAM

CROSS REFERENCE TO RELATED APPLICATIONS

This application is a National Stage of International Application No. PCT/JP2016/068920filed Jun. 24, 2016, claiming priority based on Japanese Patent Application No. 2015-139792, filed Jul. 13, 2015, the contents of all of which are incorporated herein by reference in their entirety.

TECHNICAL FIELD

The present invention relates to an estimating device and an estimating program, and in particular, to an estimating device and an estimating program that estimate the pitch angle of a vehicle.

BACKGROUND ART

There has conventionally been proposed a technique of estimating the pitch angle of a vehicle on the basis of plural images that are captured at different times by an image pickup section provided at the vehicle (see, for example, Japanese Patent Application Laid-Open (JP-A) No. 2012-026992). In this technique, on the basis of the aforementioned plural images, a translation vector that expresses the moving direction of the aforementioned image pickup section, and a rotation matrix that expresses the angle change amounts in the pitch direction of the posture of the aforementioned image pickup section, are computed.

Further, in this technique, on the basis of the direction of the aforementioned translation vector, first estimated pitch angle values are successively computed, and, by integrating the angle change amounts expressed by the aforementioned rotation matrix, second estimated pitch angle values are computed. Then, in this technique, an estimated value of the pitch angle of the vehicle is determined by correcting the second estimated pitch angle values in accordance with the deviation between the average value of the first estimated pitch angle values and the average value of the second estimated pitch angle values in a predetermined time period.

SUMMARY OF INVENTION

Technical Problem

In the above-described technique, the pitch angle of the vehicle is estimated on the basis of the limitation that the aforementioned translation vector is parallel to the road surface. Accordingly, in the above-described technique, in a case in which the magnitude of the translation vector is relatively small, i.e., in a case in which the velocity of the vehicle is relatively low, the pitch angle of the vehicle cannot be estimated accurately.

The present invention was made in consideration of the above-described circumstances, and an object thereof is to provide an estimating device and an estimating program that can accurately estimate the pitch angle of a vehicle even in a case in which the velocity of the vehicle is relatively low.

Solution to Problem

In order to achieve the above-described object, an estimating device relating to a first aspect of the present invention includes: an image pickup section, provided at a vehicle, for picking-up images of at least one of a front and a rear of the vehicle; a computing section for, on the basis of a position of a predetermined region that is within an image picked-up by the image pickup section at a first time, and a position of a region that corresponds to the predetermined region and is within an image picked-up in a same direction by the image pickup section at a second time that is after the first time, computing a movement amount of the predetermined region in a vertical direction; an integrating section for computing an integrated value of the movement amounts, each time the movement amount is computed by the computing section; correcting section for correcting the integrated value of a current point in time that is computed by the integrating section, on the basis of time series data of the integrated values of the movement amounts computed by the integrating section within a past predetermined time period; and an estimating section for estimating a pitch angle of the vehicle on the basis of the integrated value corrected by the correcting section.

An estimating program relating to a second aspect of the present invention is a program for causing a computer to function as: a computing section for, on the basis of a position of a predetermined region that is within an image picked-up at a first time by an image pickup section that is provided at a vehicle and is for picking-up images of at least one of a front and a rear of the vehicle, and a position of a region that corresponds to the predetermined region and is within an image picked-up in a same direction by the image pickup section at a second time that is after the first time, computing a movement amount of the predetermined region in a vertical direction; an integrating section for computing an integrated value of the movement amounts, each time the movement amount is computed by the computing section; a correcting section for correcting the integrated value of a current point in time that is computed by the integrating section, on the basis of time series data of the integrated values of the movement amounts computed by the integrating section within a past predetermined time period; and an estimating section for estimating a pitch angle of the vehicle on the basis of the integrated value corrected by the correcting section.

In accordance with the first and second aspects of the present invention, on the basis of a position of a predetermined region within an image picked-up at a first time by the image pickup section that is provided at a vehicle and is for picking-up images of at least one of a front and a rear of the vehicle, and a position of a region that corresponds to the predetermined region and is within an image picked-up in a same direction by the image pickup section at a second time that is after the first time, a movement amount in a vertical direction of the predetermined region is computed by the computing section.

Further, an integrated value of the movement amounts is computed by the integrating section each time the movement amount is computed by the computing section. Further, the integrated value of the current point in time that is computed by the integrating section is corrected by the correcting section on the basis of time series data of integrated values of the movement amounts computed by the integrating section within a past predetermined time period. Moreover, the pitch angle of the vehicle is estimated by the estimating section on the basis of the integrated value that has been corrected by the correcting section.

In this way, in accordance with the first and second aspects of the present invention, the integrated value of the current point in time is corrected on the basis of time series data of the integrated value within a past predetermined time period. Therefore, the pitch angle of the vehicle can be estimated accurately even in a case in which the velocity of the vehicle is low.

In an estimating device of a third aspect of the present invention, in the first aspect, the correcting section may correct the integrated value of the current point in time by using, as a correction amount, an average value of the time series data of the integrated values of the movement amounts.

In an estimating device of a fourth aspect of the present invention, in the first aspect, the correcting section may compute, as a correction amount, an extrapolated value obtained by approximating the time series data of the integrated values of the movement amounts, and may correct the integrated value of the current point in time by using the correction amount.

In an estimating device of a fifth aspect of the present invention, in any one of the first, third and fourth aspects, on the basis of the time series data of the integrated values of the movement amounts, and the integrated value of the current point in time computed by the integrating section, the correcting section may compute the corrected integrated value of the current point in time as an amount of offset, from a steady state, of the image in the vertical direction at the current point in time.

In an estimating device of a sixth aspect of the present invention, in any one of the first and the third through the fifth aspects, the predetermined region may be a region that includes a vanishing point in perspective.

In an estimating device of a seventh aspect of the present invention, in any one of the first and the third through the sixth aspects, the correcting section may correct the integrated value of the current point in time by making the predetermined time period be a longer time period the later the point in time of correction is.

In an estimating device of an eighth aspect of the present invention, in any one of the first and the third through the seventh aspects, the computing section may compute the movement amount after retrieving, by pattern matching, the predetermined region of the second time that corresponds to the predetermined region of the first time.

Note that the storage medium that stores the estimating program relating to the second aspect of the present invention is not particularly limited, and may be a hard disk or may be a ROM. Further, the storage medium may be a CD-ROM, a DVD disk, a magneto-optical disk, or an IC card. Still further, the estimating program may be downloaded from a server or the like that is connected to a network.

Advantageous Effects of Invention

In accordance with the respective aspects of the present invention, the effect is obtained that the pitch angle of a vehicle can be estimated accurately even in a case in which the velocity of the vehicle is low.

DESCRIPTION OF EMBODIMENTS

Examples of forms for embodying the present invention are described in detail hereinafter with reference to the drawings.

[First Embodiment]

First, the structure of an estimating device 10A relating to the present embodiment is described with reference to FIG. 1.

Figure 1:
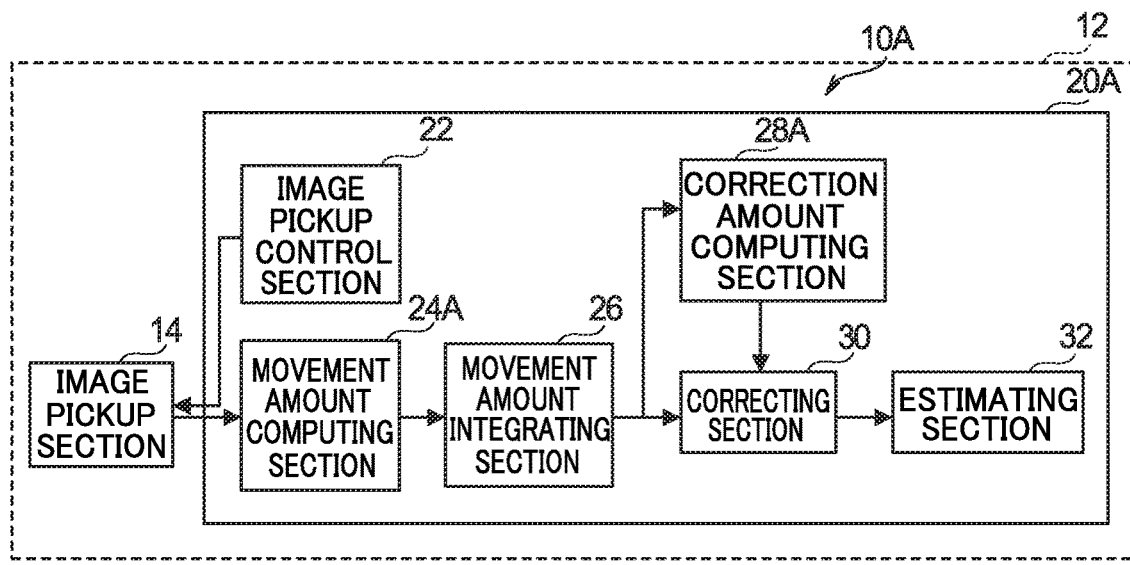
FIG. 1 is a block drawing showing the structure of an estimating device relating to a first embodiment.

As shown in FIG. 1, the estimating device 10A relating to the present embodiment has an image pickup section 14 and a computer 20A that are respectively provided at a vehicle 12.

The image pickup section 14 relating to the present embodiment is, as an example, a monocular, on-board camera, and, due to control of the computer 20A, picks-up images of the front of the vehicle 12 at a predetermined time interval (33 milliseconds as an example in the present embodiment), and successively outputs image data expressing the picked-up images to the computer 20A. Note that the image pickup section 14 may be a structure that picks-up color images, or may be a structure that picks-up monochrome images. Further, the image pickup section 14 may be a structure at which the picking-up of video images is possible, or may be a structure at which the picking-up of still images taken by rapid shooting is possible.

The computer 20A relating to the present embodiment has a CPU, a RAM, a ROM that stores an estimating processing program that is described later, and a non-volatile storage section, and, functionally, is structured as follows. The computer 20A has an image pickup control section 22, a movement amount computing section 24A, a movement amount integrating section 26, a correction amount computing section 28A, a correcting section 30, and an estimating section 32. Note that the image pickup section 14 is an example of the image pickup section, and the movement amount computing section 24A is an example of the computing section. Further, the movement amount integrating section 26 is an example of the integrating section, and the correction amount computing section 28A and the correcting section 30 are an example of the correcting section, and the estimating section 32 is an example of the estimating section.

The image pickup control section 22 relating to the present embodiment controls the image pickup section 14, and causes the image pickup section 14 to pick-up images of the front of the vehicle 12 at the aforementioned predetermined time interval.

The movement amount computing section 24A relating to the present embodiment successively acquires image data that is outputted from the image pickup section 14 at a predetermined time interval. Further, the movement amount computing section 24A computes movement amount $\delta y^t$, which is described later, by using image data that is acquired at time t that is the current point in time and image data that is acquired at time t-1 that is the one predetermined time interval before the current point in time. Hereinafter, the processing of computing the movement amount $\delta y^t$ by the movement amount computing section 24A is described in detail with reference to FIG. 2.

Figure 2:
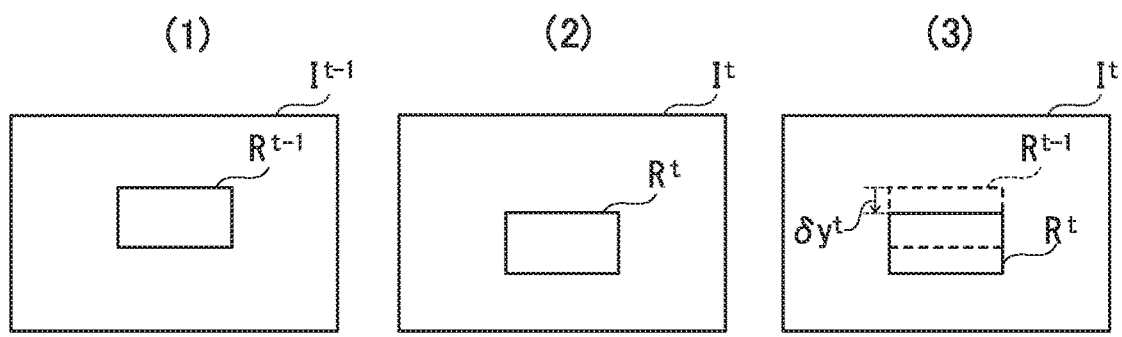
FIG. 2 is a schematic drawing provided for explanation of a movement amount in a vertical direction of a predetermined region within an image obtained by image pickup by an image pickup section relating to the first embodiment.

FIG. 2(1) shows image $I^{t-1}$ that is expressed by the image data that is acquired at time t-1 by the movement amount computing section 24A. FIG. 2(2) shows image $I^t$ that is expressed by the image data that is acquired at time t by the movement amount computing section 24A. Further, FIG. 2(3) shows the movement amount $\delta y^t$ in the vertical direction (the pitching direction of the vehicle 12) of region $R^t$, which is within the image $I^t$, with respect to region $R^{t-1}$.

First, as shown in FIG. 2(1), the movement amount computing section 24A extracts, from the image data that expresses the image $I^{t-1}$, image data that expresses the image within the rectangular region $R^{t-1}$ that is of a predetermined size and that includes a predetermined position within the image $I^{t-1}$. Concretely, as an example, the movement amount computing section 24A relating to the present embodiment extracts the image data that expresses the image that is within the rectangular region $R^{t-1}$ that is ⅓ of the length of the entire picked-up region in both the height direction and the lateral direction of FIG. 2(1) and that includes the central portion of the entire picked-up region.

Next, in FIG. 2(2), by pattern matching, the movement amount computing section 24A searches for the region $R^t$, which corresponds to the region $R^{t-1}$, within the image $I^t$. Concretely, as an example, the movement amount computing section 24A relating to the present embodiment, while shifting the position of a region that is the same shape and size as the region $R^{t-1}$ by a predetermined number of pixels (three pixels in the present embodiment) each time in the rightward direction to the right end from the position of the upper left end in FIG. 2(2) of the image $I^t$, computes a degree that expresses the correlation between the image data, which expresses the image within that region, and the image data which expresses the image within region $R^{t-1}$. Further, the movement amount computing section 24A repeatedly carries out this computing processing in the downward direction in FIG. 2(2) by a predetermined number of pixels (two pixels in the present embodiment) each time to the lower end of the image $I^t$.

Then, the movement amount computing section 24A determines the region, at which the degree that expresses the aforementioned correlation is the highest, to be the region $R^t$. Note that, in the present embodiment, a region at which the sum, for all of the pixels, of the absolute values of the differences between the pixel values of the corresponding pixels, is a minimum, is used as the region at which the degree that expresses the aforementioned correlation is the highest, but the present invention is not limited to this. For example, a region at which the sum, for all of the pixels, of the absolute values of the differences between the pixel values of pixels of predetermined positions of each of plural corresponding pixel groups, such as 2 pixels×2 pixels or the like, may be used as the region at which the degree that expresses the aforementioned correlation is the highest.

Then, as shown in FIG. 2(3), the movement amount computing section 24A computes, as the movement amount $\delta y^t$, the number of pixels in the vertical direction (the up-down direction in FIG. 2(3)) between pixel positions that express a corresponding position in region $R^{t-1}$ and region $R^t$ (the position of the upper left end portion in FIG. 2(3)).

In this way, the movement amount computing section 24A relating to the present embodiment determines the region, which is within the image $I^t$ and at which the degree that expresses the aforementioned correlation is the highest, to be the region $R^t$, but the present invention is not limited to this. For example, the movement amount computing section 24A may determine any of the regions, whose degree expressing the aforementioned correlation is greater than or equal to a predetermined threshold value among regions within the image $I^t$, to be the region $R^t$.

In this case, for example, a form is exemplified in which the movement amount computing section 24A starts the above-described searching, and determines a region, whose degree expressing the aforementioned correlation is greater than or equal to the aforementioned threshold value and which is retrieved first in the searching process, to be the region $R^t$. Due thereto, although there is the possibility that the accuracy of retrieving the region $R^t$ by the movement amount computing section 24A will decrease, the above-described processing for searching the entire range of the image $I^t$ by the movement amount computing section 24A does not have to be carried out, and therefore, the amount of computation by the movement amount computing section 24A is reduced.

By using following formula (1), the movement amount integrating section 26 relating to the present embodiment computes, as integrated value $S_y^t$ of the movement amount $\delta y^t$ at time t, the integrated value of the movement amounts $\delta y^t$ that have been successively computed by the movement amount computing section 24A.

[Formula 1]

$$S_y^t = \sum_{s=1}^{t} \delta y^s \qquad (1)$$

Figure 3:
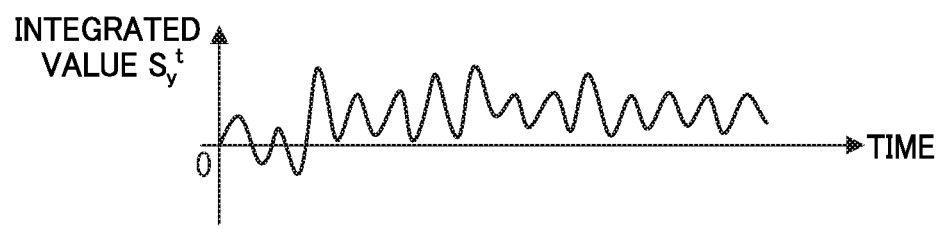
FIG. 3 is a graph showing time series data of an integrated value of the movement amounts relating to the first embodiment.

An example of time series data of the integrated value $S_y^t$ that is computed by the movement amount integrating section 26 is shown in FIG. 3. Note that the vertical axis in FIG. 3 shows the integrated value $S_y^t$, and the horizontal axis shows time. As shown in FIG. 3, as time passes, the integrated value $S_y^t$ becomes a value that is offset.

This is because, due to the movement amount integrating section 26 integrating the movement amounts $\delta y^t$ that are successively computed by the movement amount computing section 24A as described above, the errors that are included in the movement amounts $\delta y^t$ also are integrated. Note that these errors are due to, for example, the effects of the image processing at the time of searching for the above-described region $R^t$ by the movement amount computing section 24A, and the effects that are due to the subject of imaging itself that is picked-up within the region $R^{t-1}$ moving during the time period from time t-1 to time t, and the like.

Thus, the correction amount computing section 28A relating to the present embodiment computes correction amount $c^t$ for correcting the aforementioned errors, on the basis of time series data of the integrated value $S_y^t$ of the movement amounts $\delta y^t$ that were computed by the movement amount integrating section 26 during a past predetermined time period. Hereinafter, the processing of computing the correction amount $c^t$ by the correction amount computing section 28A is described in detail with reference to FIG. 4. Note that the time series data of the integrated value $S_y^t$ that is shown in FIG. 3 is shown by the dashed line in FIG. 4. Further, in the same way as in FIG. 3, the vertical axis in FIG. 4 shows the integrated value $S_y^t$, and the horizontal axis shows time.

Figure 4:
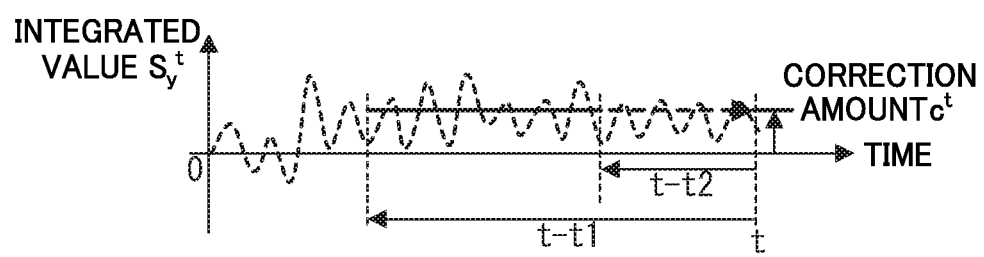
FIG. 4 is a graph provided for explanation of correction amount computing processing relating to the first embodiment.

As shown in FIG. 4, by using following formula (2), the correction amount computing section 28A relating to the present embodiment computes, as the correction amount $c^t$ at time t, the average value of the integrated values $S_y^t$ that were computed at the respective times of each of the aforementioned predetermined time intervals in a past predetermined time period (the time period from time t-t1 to time t-t2 in FIG. 4).

[Formula 2]

$$c^t = \frac{\sum_{j=t-t1}^{t-t2} S_y^j}{T1 - T2 + 1} \quad (2)$$

wherein T1 represents the number of times that the integrated value $S_y^t$ was computed from time t-t1 to time t, and T2 represents the number of times that the integrated value $S_y^t$ was computed from time t-t2 to time t.

Note that, in the present embodiment, a time period, in which the estimation accuracy of the pitch angle of the vehicle 12 that is described later falls within an allowable range, is fixedly used as the aforementioned past predetermined time period from experiments using an actual vehicle 12, computer simulation based on the design specifications of the vehicle 12, or the like, but the present invention is not limited to this. As described above, because the aforementioned errors also are integrated, a time period, which is longer the later the point in time when the correction amount $c^t$ is computed, may be used as the aforementioned predetermined time period.

The correcting section 30 relating to the present embodiment corrects the integrated value $S_y^t$, which was computed by the movement amount integrating section 26, by using the correction amount $c^t$ that was computed by the correction amount computing section 28A. Concretely, by subtracting the correction amount $c^t$ from the integrated value $S_y^t$ by using following formula (3), the correcting section 30 computes offset amount $\Delta Y^t$ of the vertical direction position of a horizontal line within the image at time t that is the current point in time, with respect to the vertical direction position of a horizontal line within the image in the steady state. Note that steady state here is, for example, a state in which there is hardly any shaking of the vehicle 12 with respect to the vertical direction, such as a state in which the vehicle 12 is stopped, or a state in which a state of above-described movement amount $\delta y^t \approx 0$ continues for a long time, or the like.

[Formula 3]

$$\Delta Y^t = S_y^t - c^t \quad (3)$$

Figure 5:
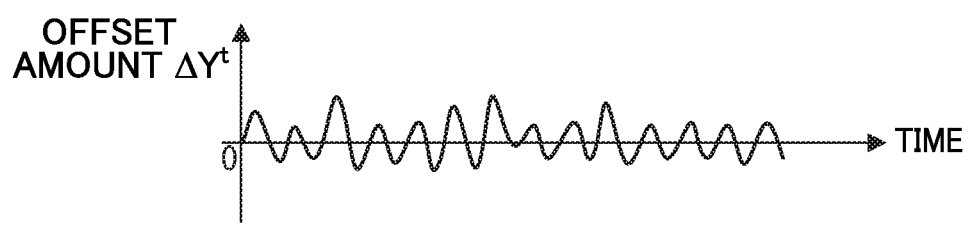
FIG. 5 is a graph showing time series data of a vertical direction offset amount relating to the first embodiment.

FIG. 5 illustrates the time series data of the offset amount $\Delta Y^t$ that is obtained by the correcting section 30 correcting, at respective times of each of the aforementioned predetermined time intervals, the time series data of the integrated value $S_y^t$ shown in FIG. 3. Note that the vertical axis in FIG. 5 shows the offset amount $\Delta Y^t$, and the horizontal axis shows time.

The offset amount $\Delta Y^t$ is described in detail here. Vertical direction position $Y^t$ of a horizontal line in the image that was picked-up by the image pickup section 14 at time t is expressed by following formula (4).

[Formula 4]

$$Y^t = Y^0 + \Delta Y_t \quad (4)$$

wherein $Y^0$ represents the vertical direction position of the horizontal line in the above-described steady state.

Further, generally, the position $Y^t$ at time t fluctuates around the position $Y^0$ of the steady state. Therefore, the average value of the offset amount $\Delta Y^t$ that is computed at each time up until time t is approximately equal to 0 (zero). Further, in a case in which the aforementioned errors are not included in the movement amounts $\delta y^t$, the integrated value $S_y^t$ is equal to the offset amount $\Delta Y^t$. Namely, in this case, the average value of the integrated value $S_y^t$ also is equal to 0 (zero).

However, as described above, the aforementioned errors of the movement amounts $\delta y^t$ are included in the integrated value $S_y^t$. Thus, in the present embodiment, as described above, the average value of the integrated values $S_y^t$, which are computed at the respective times of each of the aforementioned predetermined time intervals of the aforementioned predetermined time period, is computed as the correction amount $c^t$ that is used in correcting the aforementioned errors.

The estimating section 32 relating to the present embodiment estimates the pitch angle of the vehicle 12 on the basis of the integrated value $S_y^t$ that is corrected by the correcting section 30 (=the offset amount $\Delta Y^t$). Concretely, the estimating section estimates pitch angle $\varphi^t$ of the image pickup section 14 from the offset amount $\Delta Y^t$ by using a specification value such as the resolution or the focal length or the like of the image pickup section 14.

This pitch angle $\varphi^t$ is the angle of the optical axis of the image pickup section 14 at time t with respect to the optical axis of the image pickup section 14 in the steady state. Therefore, the estimating section 32 computes pitch angle $\varphi^0$ of the optical axis of the image pickup section 14, with respect to the road surface, of the image pickup section 14 in the steady state. Then, the estimating section 32 computes the angle, in which the pitch angle $\varphi^t$ and the pitch angle $\varphi^0$ that is the angle of the optical axis of the image pickup section 14 with respect to the road surface are added, as the pitch angle of the vehicle 12 at time t.

Here, the processing of computing the pitch angle $\varphi^0$ in the above-described steady state is described with reference to FIG. 6. Here, in order to avoid complexity, as an example, description is given with the image pickup section 14 being an image pickup section whose optical axis is positioned at the center of the image in a case in which the pitch angle of the optical axis with respect to the road surface is 0°. Note that FIG. 6 shows an example of image $I^0$ that has been picked-up by the image pickup section 14 in the above-described steady state.

Figure 6:
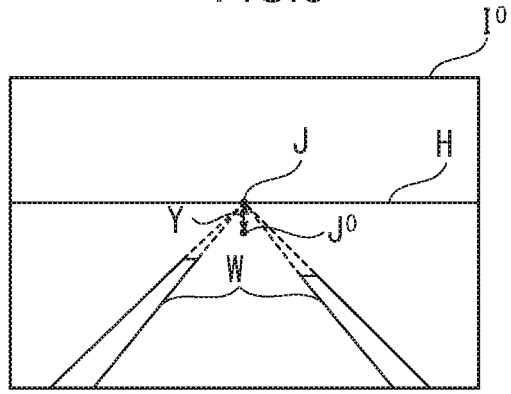
FIG. 6 is a schematic drawing provided for explanation of computing processing of a vertical direction offset amount in a steady state, relating to the respective embodiments.

As shown in FIG. 6, the estimating section 32 considers intersection point J of two white lines W to be the vertical direction position of horizontal line H, and computes the number of pixels in the vertical direction (the up-down direction in FIG. 6) between the pixel positions of the intersection point J and an intersection point $J^0$ of the image $I^0$ that has been obtained in advance for a case in which the pitch angle of the vehicle is 0°, as the offset amount Y of the position of the horizontal line in the steady state. Then, by using a specification value such as the resolution or the focal length or the like of the image pickup section 14, the estimating section 32 computes the pitch angle $\varphi^0$ from the offset amount Y. Note that the processing of computing the pitch angle $\varphi^0$ in the steady state is not limited to this, and another known method may be used.

Operation of the estimating device 10A relating to the present embodiment is described next with reference to FIG. 7. Note that FIG. 7 is a flowchart showing the flow of processings of an estimation processing program that is executed by the CPU of the computer 20A at the time when, for example, the ignition switch of the vehicle 12 is set in an on state.

Figure 7:
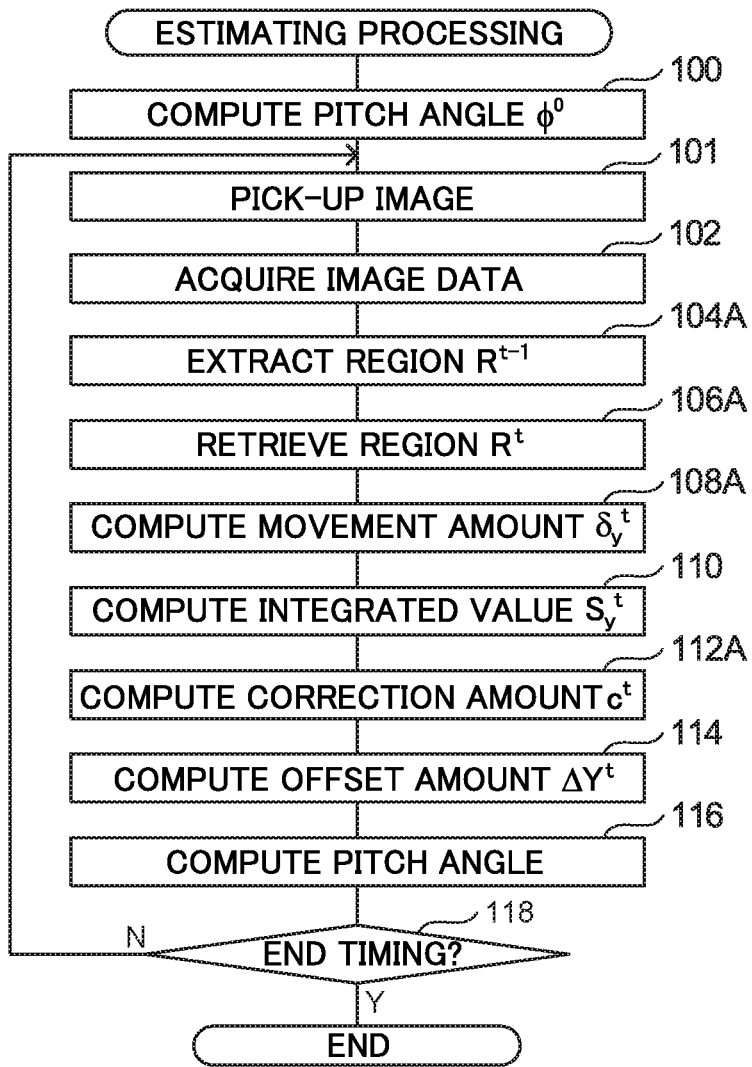
FIG. 7 is a flowchart showing the flow of estimating processing relating to the first embodiment.

In step 100 of FIG. 7, as described above, the estimating section 32 controls the image pickup section 14, and causes an image of the front of the vehicle 12 to be picked-up, and computes the pitch angle $\varphi^0$ in the steady state from the image $I^0$ obtained by this image pickup.

In next step 101, the image pickup control section 22 controls the image pickup section 14, and causes an image of the front of the vehicle to be picked-up. In next step 102, the movement amount computing section 24A acquires image data that expresses image $I^t$ that was outputted from the image pickup section 14 by the processing of above-described step 101.

In next step 104A, the movement amount computing section 24A extracts, from the image data that was acquired by the processing of above-described step 102 of the previous time in the repeated processings of above-described step 101 through step 118 that is described later, the image data that expresses the image within the region $R^{t-1}$ of the image $I^{t-1}$ that is expressed by this image data. Note that the processing of present step 104A, and the processings of step 106A through step 116 that are described later, are not executed at the time of the initial execution after the start of execution of the present estimating processing program.

In next step 106A, as described above, the movement amount computing section 24A searches for the region $R^t$, which corresponds to the region $R^{t-1}$ extracted by the processing of above-described step 104A, in the image $I^t$ expressed by the image data that was acquired by the processing of the immediately-previous, above-described step 102.

In next step 108A, as described above, the movement amount computing section 24A computes the movement amount $\delta y^t$ on the basis of the corresponding pixel positions of the region $R^{t-1}$, which was extracted by the processing of above-described step 104A, and the region $R^t$ which was retrieved by the processing of above-described step 106A.

In next step 110, as described above, by using above formula (1), the movement amount integrating section 26 computes the integrated value $S_y^t$ of the movement amount $\delta y^t$ that was computed by the processing of above-described step 108A.

In next step 112A, by using above formula (2), the correction amount computing section 28A computes the average value of the integrated values $S_y^t$, which were computed by the processing of above-described step 110 in the above-described past predetermined time period, as the correction amount $c^t$.

In next step 114, by using above formula (3), the correcting section 30 computes the offset amount $\Delta Y^t$ by subtracting the correction amount $c^t$, which was computed by the processing of above-described step 112A, from the integrated value $S_y^t$ which was computed by the processing of above-described step 110.

In next step 116, as described above, by using the specification value of the image pickup section 14, the estimating section 32 computes the pitch angle $\varphi^t$ from the offset amount $\Delta Y^t$ that was computed by the processing of above-described step 114. Then, as described above, the estimating section 32 adds this pitch angle $\varphi^t$ and the pitch angle $\varphi^0$ that was computed by the processing of above-described step 100, and computes the pitch angle of the vehicle 12. Note that the pitch angle that is computed here is used in a case of estimating three-dimensional information from two-dimensional information, such as a case of estimating the distance to a given object within the image of the front of the vehicle 12 that is picked-up by an image pickup section such as a camera or the like, or the like, in advanced driving support of the vehicle 12 or the like for example.

In step 118, the estimating section 32 judges whether or not a predetermined end time has been reached. If this judgment is a negative judgment, the routine returns to the processing of above-described step 101, and, on the other hand, if this judgment is an affirmative judgment, the present estimating processing program is ended. Note that, in the present embodiment, as an example, the time when the ignition switch of the vehicle 12 is set in an off state is used as the aforementioned predetermined end time.

Note that, as described above, for example, in a case in which a state (i.e., the steady state), in which the movement amount $\delta y^t$ computed by the processing of above-described step 108A is approximately 0 (zero) for a long time, continues, the integrated value $S_y^t$ may be reset to 0 (zero), and the present estimating processing program may be executed again from the processing of step 100.

As described above, in accordance with the present embodiment, the integrated value $S_y^t$ of the current point in time is corrected on the basis of time series data of the integrated values $S_y^t$ within a past predetermined time period. Therefore, even in a case in which the velocity of the vehicle 12 is relatively low, the pitch angle of the vehicle 12 can be estimated accurately by using the monocular image pickup section 14. Further, in accordance with the present embodiment, the pitch angle of the vehicle 12 can be estimated accurately by a small computation amount, as compared with a case of computing the above-described translation vector and rotation matrix.

[Second Embodiment]

First, the structure of an estimating device 10B relating to the present embodiment is described with reference to FIG. 8. Note that structural elements in FIG. 8 that have the same functions as in FIG. 1 are denoted by the same reference numerals as in FIG. 1, and description thereof is omitted.

Figure 8:
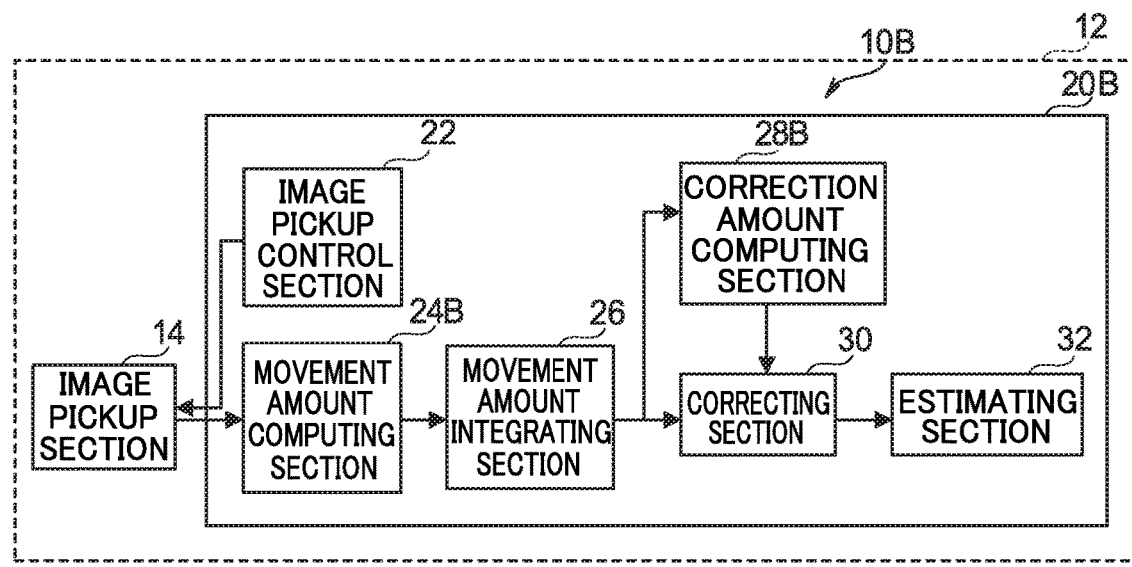
FIG. 8 is a block drawing showing the structure of an estimating device relating to a second embodiment.

As shown in FIG. 8, the estimating device 10B relating to the present embodiment differs from the estimating device 10A relating to the above-described first embodiment with regard to the point that the estimating device 10B has a computer 20B instead of the computer 20A. Further, the computer 20B relating to the present embodiment differs from the computer 20A relating to the above-described first embodiment with regard to the point that the computer 20B has a movement amount computing section 24B instead of the movement amount computing section 24A, and the point that the computer 20B has a correction amount computing section 28B instead of the correction amount computing section 28A.

The movement amount computing section 24B relating to the present embodiment successively acquires image data that is outputted from the image pickup section 14 at a predetermined time interval. Further, the movement amount computing section 24B computes the movement amount $\delta y^t$ by using image data that was acquired at time t that is the current point in time and image data that is acquired at time t-1 that is the one predetermined time interval before the current point in time. Hereinafter, the processing of computing the movement amount $\delta y^t$ by the movement amount computing section 24B is described in detail with reference to FIG. 9.

Figure 9:
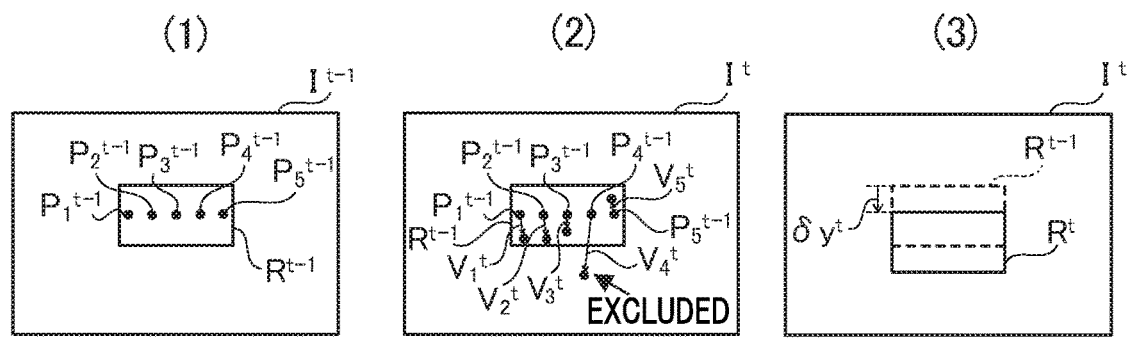
FIG. 9 is a schematic drawing provided for explanation of optical flow computing processing relating to the second embodiment.

FIG. 9(1) shows the image $I^{t-1}$ that is expressed by the image data that is acquired at time t-1 by the movement amount computing section 24B, and points (hereinafter called "computation points") $P_i^{t-1}$ ((i=1 N (N is a natural number, and is 5 in the present embodiment)) that are used in computing optical flow $V_i^t$ that is described later. Further, FIG. 9(2) shows the image $I^t$ that is expressed by the image data that is acquired at time t by the movement amount computing section 24B, and the optical flow $V_i^t$ that is described later. Further, FIG. 9(3) shows the movement amount $\delta y^t$, in the same way as FIG. 2(3).

First, as shown in FIG. 9(1), the movement amount computing section 24BA extracts, from the image data that expresses the image $I^{t-1}$, image data that expresses the image that is within the rectangular region $R^{t-1}$ that is of the aforementioned predetermined size within the image $I^{t-1}$. Note that, in the present embodiment, a region that includes the vanishing point in perspective in a case in which the vehicle 12 is advancing in a state in which pitching of the vehicle 12 does not arise, is used as the region $R^{t-1}$. This is because this region is a region that can be considered to be a region at which there is relatively little movement due to the effects of the advancing of the vehicle 12.

Next, as shown in FIG. 9(1), the movement amount computing section 24B determines N predetermined positions within the region $R^{t-1}$ to be positions of the computation points $P_i^{t-1}$. Note that, in the present embodiment, as an example, positions, which are separated at the same interval from one another with respect to the horizontal direction (the lateral direction in FIG. 9(1)) at the central position of the region $R^{t-1}$ with respect to the vertical direction (the height direction in FIG. 9(1)), are used as the positions of the computation points $P_i^{t-1}$. In this way, in the present embodiment, positions that are determined fixedly in advance are used as the positions of the computation points $P_i^{t-1}$, but the present invention is not limited to this. For example, positions at which it is easy to achieve correspondence between corresponding points of plural images by using the Harris operator (Refer to "C. Harris and M. Stephens (1988). "A combined corner and edge detector". "Proceedings of the 4th Alvey Vision Conference". pp. 147-151".), or the like, may be used as the positions of the computation points $P_i^{t-1}$.

Further, as shown in FIG. 9(2), the movement amount computing section 24B computes the optical flow $V_i^t$ (={$vx_i^t$, $vy_i^t$}) at time t respectively for each computation point $P_i^{t-1}$. Here, aforementioned $vx_i^t$ represents the x component (the horizontal direction component) of the optical flow $V_i^t$, and aforementioned $vy_i^t$ represents the y component (the vertical direction component) of the optical flow $V_i^t$. Note that, in the present embodiment, a block matching method is used as the method that is used in computing the optical flow $V_i^t$, but the present invention is not limited to this. For example, another method such as the lucas-kanade method or the like may be used as the method.

Further, the movement amount computing section 24B computes, as the movement amount $\delta y^t$, the average value of the y components ($vy_i^t$) of the optical flow $V_i^t$. Note that, at the time of computing this average value, the movement amount computing section 24B relating to the present embodiment sets a range in which the y component values of the optical flow $V_i^t$ are normal values, and does not include the optical flow $V_i^t$ ($V_4^t$ shown in FIG. 9(2)) that is outside of the predetermined range. Concretely, for example, at the time of computing the aforementioned average value, the movement amount computing section 24B does not include the optical flow $V_i^t$ at which the difference between the average value of the y component values and those of the other optical flows $V_i^t$ is outside of a predetermined range (e.g., a range of ±50% of this average value).

In this way, in the present embodiment, the average value of the y component values of the optical flow $V_i^t$ is used as the movement amount $\delta y^t$, but the present invention is not limited to this. For example, the median of the y component values of the optical flow $V_i^t$ may be used as the movement amount $\delta y^t$.

Figure 10:
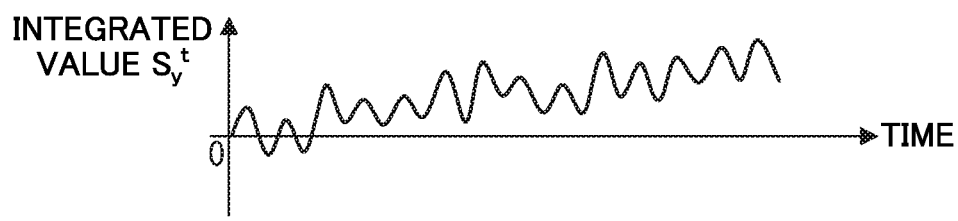
FIG. 10 is a graph showing time series data of an integrated value of the movement amounts relating to the second embodiment.

The correction amount computing section 28B relating to the present embodiment computes the correction amount $c^t$ on the basis of time series data of the integrated value $S_y^t$ of the movement amounts $\delta y^t$ that were computed by the movement amount integrating section 26 during a past predetermined time period. Hereinafter, the processing of computing the correction amount $c^t$ by the correction amount computing section 28B is described in detail with reference to FIG. 10 and FIG. 11. Note that the time series data of the integrated value $S_y^t$ is shown in FIG. 10, in the same way as in FIG. 3. Further, the time series data of the integrated value $S_y^t$ that is shown in FIG. 10 is shown by the dashed line in FIG. 11, in the same way as in FIG. 4.

Figure 11:
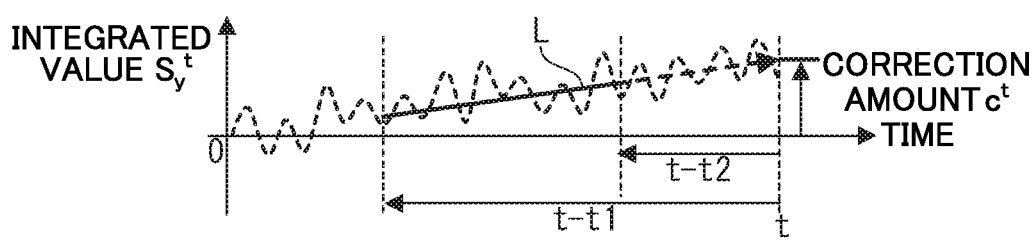
FIG. 11 is a graph provided for explanation of correction amount computing processing relating to the second embodiment.
Figure 12:
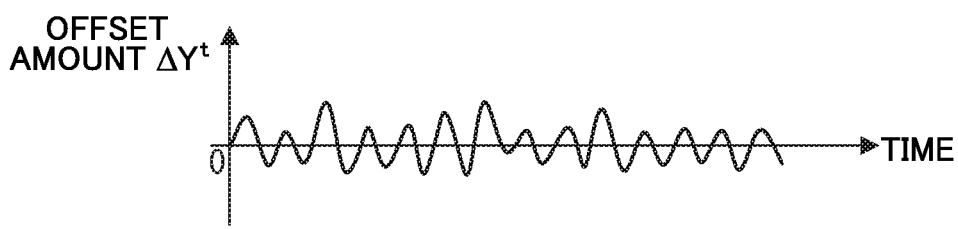
FIG. 12 is a graph showing time series data of a vertical direction offset amount relating to the second embodiment.

The errors, which are included in the above-described movement amount $\delta y^t$ in the above-described first embodiment, are not limited to being a uniform value. Thus, in the present embodiment, as shown in FIG. 11, the correction amount computing section 28B computes first-order coefficients and constants that express a linear expression that expresses a regression line L, by approximating the integrated values $S_y^t$, which were computed at the respective times of each of the aforementioned predetermined time intervals of a past predetermined time period (the time period from time t-t1 to time t-t2 in FIG. 11), by using the least squares method or the like for example. Then, the correction amount computing section 28B computes the correction amount $c^t$ at time t by extrapolation using this linear expression. Note that, in the same way as in FIG. 5, FIG. 12 shows the time series data of the offset amount $\Delta Y^t$ that is obtained by the correcting section 30 correcting, at respective times of each of the aforementioned predetermined time intervals, the time series data of the integrated value $S_y^t$ shown in FIG. 11.

In this way, in the present embodiment, the time series data of the integrated value $S_y^t$ is approximated by a linear expression, but the present invention is not limited to this. For example, the time series data of the integrated value $S_y^t$ may be approximated by a quadratic expression or the like, and the method of approximation is not limited provided that it is possible to compute the correction amount $c^t$ of time t by extrapolation from the time series data of the integrated values $S_y^t$ of a past predetermined time period.

Figure 13:
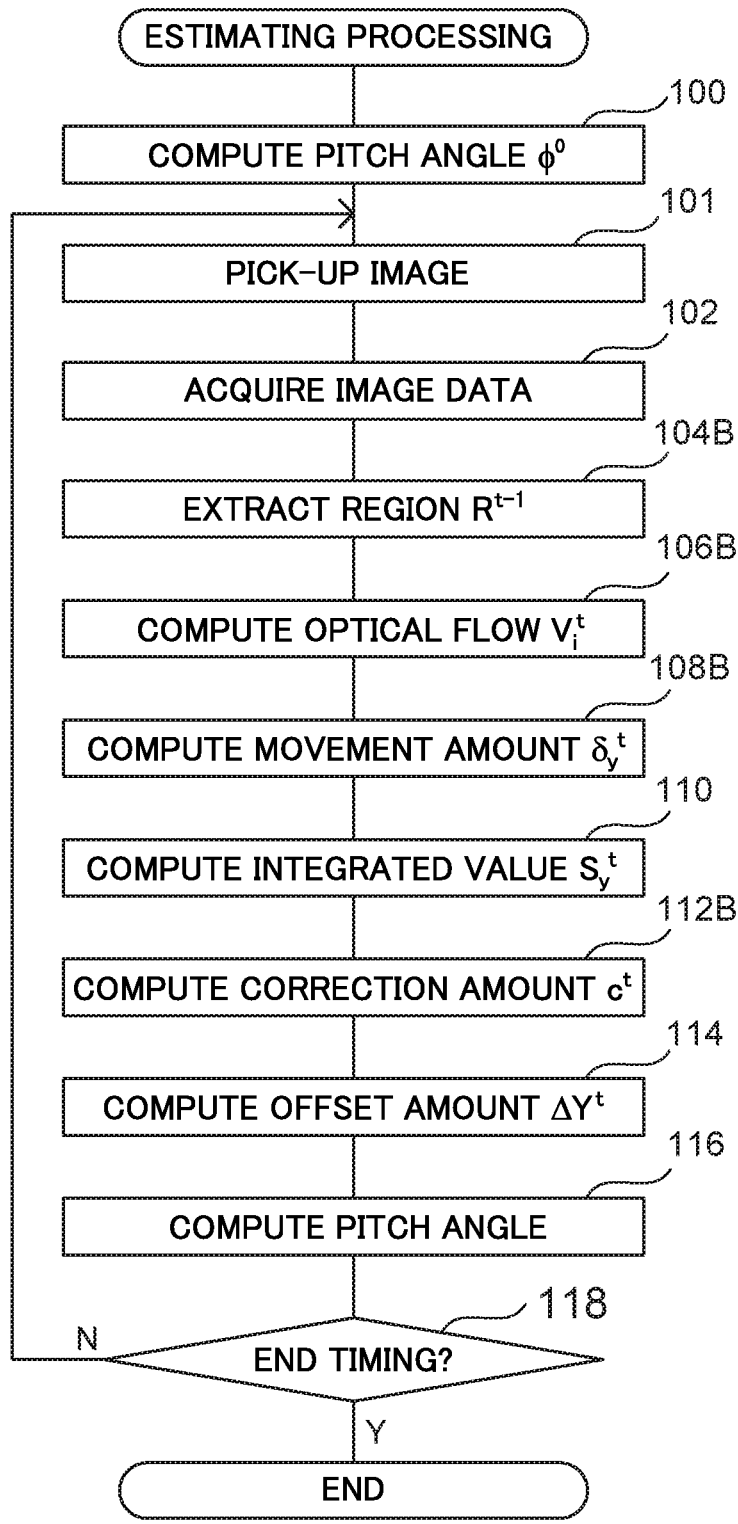
FIG. 13 is a flowchart showing the flow of estimating processing relating to the second embodiment.

Operation of the estimating device 10B relating to the present embodiment is described next with reference to FIG. 13. Note that FIG. 13 is a flowchart showing the flow of processings of an estimation processing program that is executed by the CPU of the computer 20B at the time when, for example, the ignition switch of the vehicle 12 is set in an on state. Further, steps in FIG. 13 that are executed by the same processings as in FIG. 7 are denoted by the same step numbers as in FIG. 7, and description thereof is omitted.

In step 104B of FIG. 13, the movement amount computing section 24B extracts, from the image data that was acquired by the processing of above-described step 102 of the previous time in the above-described repeated processings, the image data that expresses the image within the region $R^{t-1}$ of the image $I^{t-1}$ that is expressed by this image data.

In next step 106B, as described above, the movement amount computing section 24B determines N of the aforementioned predetermined positions within the region $R^{t-1}$, which is expressed by the image data extracted by the processing of above-described step 104B, to be positions of the computation points $P_i^{t-1}$. Then, as described above, the movement amount computing section 24B computes the optical flow $V_i^t$ for each computation point $P_i^{t-1}$ by using the image data extracted by the processing of above-described step 104B and the image data acquired by the processing of the immediately-previous, above-described step 102.

In next step 108B, as described above, the movement amount computing section 24B computes, as the movement amount $\delta y^t$, the average value of the y components of the optical flow $V_i^t$ of each computation point $P_i^{t-1}$ computed by the processing of above-described step 106B.

Thereafter, in step 112B, as described above, the correction amount computing section 28B computes the correction amount $c^t$ on the basis of time series data of the integrated value $S_{y'}^t$ of the movement amounts $\delta y^t$ that were computed by the movement amount computing section 24B during a past predetermined time period.

As described above, in accordance with the present embodiment, effects that are similar to those of the above-described first embodiment can be achieved.

Note that, in the above-described first embodiment, the region that includes the above-described vanishing point may be used as the region $R^{t-1}$, in the same way as in the above-described second embodiment. Further, in the above-described first embodiment, the movement amount $\delta y^t$ may be computed by using the optical flow $V_i^t$, in the same way as in the above-described second embodiment. Further, in the above-described first embodiment, the time series data of the integrated values $S_{y'}^t$ within a past predetermined time period may be approximated, and the correction amount $c^t$ may be computed by extrapolation, in the same way as in the above-described second embodiment. Further, in the above-described second embodiment as well, in a case in which a state, in which the movement amount $\delta y^t$ is approximately 0 (zero) for a long time, continues, the integrated value $S_{y'}^t$ may be reset to 0 (zero), and the estimating processing program may be executed again from the processing of step 100 again.

Further, the above-described respective embodiments describe cases in which images at the front of the vehicle 12 are picked-up by the image pickup section 14, but the present invention is not limited to this. For example, there may be a form in which images at the rear of the vehicle 12 are picked-up by the image pickup section 14. In this case, for example, a form is exemplified in which the pitch angle of the vehicle 12 is computed in the same way as in the above-described respective embodiments, and an angle whose positive/negative sign is opposite that of this pitch angle is estimated as the pitch angle of the vehicle 12.

Further, the above-described respective embodiments and the above-described example of a form in which images at the rear of the vehicle 12 are picked-up by the image pickup section 14 may be combined. In this case, it is thought that, the smaller the absolute value of the correction amount $c^t$ for correcting the above-described errors, the smaller these errors are. Thus, in this case, for example, a form is exemplified in which the pitch angle of the vehicle 12 is computed by using the correction amount $c^t$ whose absolute value is small, among the correction amounts $c^t$ that are computed by using the respective images obtained by picking-up images at the front and rear of the vehicle 12 respectively. Further, for example, a form is exemplified in which the average value of the pitch angles, which are computed by using the respective images obtained by picking-up images at the front and rear of the vehicle 12 respectively, is computed as the pitch angle of the vehicle 12.

Further, the above-described respective embodiments describe cases in which rectangular is used as the shape of the region R, but the present invention is not limited to this. It goes without saying that, for example, the shape may be another shape such as circular, triangular or the like, provided that it is a shape that is such that the movement amount $\delta y^t$ can be computed from images obtained by image pickup by the image pickup section 14.

The disclosure of Japanese Patent Application No. 2015-139792 that was filed on Jul. 13, 2015 is, in its entirety, incorporated by reference into the present specification.

The invention claimed is:

1. An estimating device comprising:
    an image pickup section, provided at a vehicle, that picks up images of at least one of a front or a rear of the vehicle;
    a computing section that, on the basis of a position of a predetermined region that is within an image picked up by the image pickup section at a first time, and a position of a region that corresponds to the predetermined region and is within an image picked up in a same direction by the image pickup section at a second time that is after the first time, computes a movement amount of the predetermined region in a vertical direction;
    an integrating section that, each time a movement amount is computed by the computing section, computes an integrated value of the movement amounts;
    a correcting section that corrects an integrated value at a current point in time that is computed by the integrating section, on the basis of time series data of integrated values of the movement amounts computed by the integrating section within a past predetermined time period; and
    an estimating section that estimates a pitch angle of the vehicle on the basis of the integrated value corrected by the correcting section.

2. The estimating device of claim 1, wherein the correcting section corrects the integrated value at the current point in time by using, as a correction amount, an average value of the time series data of the integrated values of the movement amounts.

3. The estimating device of claim 1, wherein the correcting section computes, as a correction amount, an extrapolated value obtained by approximating the time series data of the integrated values of the movement amounts, and corrects the integrated value at the current point in time by using the correction amount.

4. The estimating device of claim 1, wherein, on the basis of the time series data of the integrated values of the movement amounts, and the integrated value at the current point in time computed by the integrating section, the correcting section computes the corrected integrated value at the current point in time as an amount of offset, from a steady state, of the image in the vertical direction at the current point in time.

5. The estimating device of claim 1, wherein the predetermined region is a region that includes a vanishing point in perspective.

6. The estimating device of claim 1, wherein the correcting section corrects the integrated value at the current point in time by making the predetermined time period a longer time period as the time of correction becomes later.

7. The estimating device of claim 1, wherein the computing section computes the movement amount after retrieving, by pattern matching, the predetermined region of the second time that corresponds to the predetermined region of the first time.

8. A non-transitory recording medium storing an estimating program for causing a computer to execute a process, the process comprising:
- on the basis of a position of a predetermined region that is within an image picked up at a first time by an image pickup section that is provided at a vehicle and is for picking up images of at least one of a front or a rear of the vehicle, and a position of a region that corresponds to the predetermined region and is within an image picked up in a same direction by the image pickup section at a second time that is after the first time, computing a movement amount of the predetermined region in a vertical direction;
- each time a movement amount is computed, computing an integrated value of the movement amounts;
- correcting an integrated value at a current point in time, on the basis of time series data of integrated values of the movement amounts within a past predetermined time period; and
- estimating a pitch angle of the vehicle on the basis of the corrected integrated value.

* * * * *